(12) United States Patent
Aaltonen et al.

(10) Patent No.: US 7,730,149 B2
(45) Date of Patent: Jun. 1, 2010

(54) INTERACTIVE COMMUNICATIONS SYSTEM

(75) Inventors: Janne Aaltonen, Turku (FI); Timo Ahopelto, Helsinki (FI)

(73) Assignee: CVON Innovations Limited, London (GB)

( * ) Notice: Subject to any disclaimer, the term of this patent is extended or adjusted under 35 U.S.C. 154(b) by 75 days.

(21) Appl. No.: 11/888,850

(22) Filed: Aug. 2, 2007

(65) Prior Publication Data

US 2008/0109519 A1    May 8, 2008

(30) Foreign Application Priority Data

Nov. 2, 2006    (GB)    .................................    0621874.7

(51) Int. Cl.
*G06F 13/00*    (2006.01)
(52) U.S. Cl. ....................... 709/206; 709/227; 709/228; 709/204
(58) Field of Classification Search ......... 709/204–207, 709/227, 228
See application file for complete search history.

(56) References Cited

U.S. PATENT DOCUMENTS

| | | | |
|---|---|---|---|
| 5,408,519 A | 4/1995 | Pierce et al. | |
| 5,978,775 A | 11/1999 | Chen | |
| 5,978,833 A | 11/1999 | Pashley et al. | |
| 6,023,700 A | 2/2000 | Owens et al. | |
| 6,097,942 A | 8/2000 | Laiho | |
| 6,564,261 B1 * | 5/2003 | Gudjonsson et al. | ........ 709/227 |
| 6,820,204 B1 | 11/2004 | Desai et al. | |
| 6,920,326 B2 | 7/2005 | Agarwal et al. | |
| 7,072,947 B1 | 7/2006 | Knox et al. | |
| 7,263,535 B2 | 8/2007 | Malik | |

(Continued)

FOREIGN PATENT DOCUMENTS

DE    199 41 461 A1    3/2001

(Continued)

OTHER PUBLICATIONS

U.K. Search Report under Section 17 dated Feb. 23, 2007 issued in connection with corresponding U.K. Application No. GB0621874.7.

(Continued)

*Primary Examiner*—Kenneth R Coulter
(74) *Attorney, Agent, or Firm*—Frishauf, Holtz, Goodman & Chick, P.C.; Robert P. Michal (57) ABSTRACT

An interactive system and method for controlling access to a plurality of communications sessions involving a plurality of users including controlling access to a plurality of communications sessions, each of said communications sessions being for access by a plurality of users, wherein data identifying said plurality of communications sessions have been stored in association with data indicative of one or more characteristics thereof. The method includes receiving a request to initiate communications among members of a group of users, wherein said request includes data identifying the group of users, responsive to receiving said request, selecting a communications session on the basis of data identifying the group and at least some of said stored data indicative of characteristics of a given communications session, and transmitting messages to at least some members of the group. Each message has a message body including data providing access to the selected communications session and a destination address determined from data indicative of a given member of the group.

120 Claims, 3 Drawing Sheets

U.S. PATENT DOCUMENTS

| | | |
|---|---|---|
| 2002/0077130 A1 | 6/2002 | Owensby |
| 2002/0137507 A1 | 9/2002 | Winkler |
| 2002/0138291 A1 | 9/2002 | Vaidyanathan et al. |
| 2003/0028597 A1* | 2/2003 | Salmi et al. ............... 709/204 |
| 2003/0037103 A1* | 2/2003 | Salmi et al. ............... 709/203 |
| 2003/0040297 A1 | 2/2003 | Pecen et al. |
| 2003/0040300 A1 | 2/2003 | Bodic et al. |
| 2003/0197719 A1 | 10/2003 | Lincke et al. |
| 2003/0220946 A1 | 11/2003 | Malik |
| 2004/0019637 A1 | 1/2004 | Goodman et al. |
| 2004/0107256 A1 | 6/2004 | Odenwald et al. |
| 2004/0128353 A1 | 7/2004 | Goodman et al. |
| 2004/0192359 A1 | 9/2004 | McRaild et al. |
| 2004/0203761 A1 | 10/2004 | Baba et al. |
| 2004/0209649 A1 | 10/2004 | Lord |
| 2004/0240649 A1 | 12/2004 | Goel |
| 2004/0259526 A1 | 12/2004 | Goris et al. |
| 2005/0125397 A1 | 6/2005 | Gross et al. |
| 2005/0160165 A1 | 7/2005 | Chen et al. |
| 2005/0192008 A1 | 9/2005 | Desai et al. |
| 2005/0233776 A1 | 10/2005 | Allen et al. |
| 2006/0031327 A1 | 2/2006 | Kredo |
| 2006/0053208 A1* | 3/2006 | Laurila et al. ............... 709/206 |
| 2006/0053225 A1* | 3/2006 | Poikselka et al. ............ 709/227 |
| 2006/0123014 A1 | 6/2006 | Ng |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0212583 A1* | 9/2006 | Beadle et al. ............... 709/227 |
| 2006/0276170 A1 | 12/2006 | Radhakrishnan et al. |
| 2006/0276213 A1 | 12/2006 | Gottschalk et al. |
| 2006/0286963 A1 | 12/2006 | Koskinen et al. |
| 2006/0288124 A1 | 12/2006 | Kraft et al. |
| 2006/0726213 | 12/2006 | Gottschalk et al. |
| 2007/0047523 A1 | 3/2007 | Jiang |
| 2007/0074262 A1 | 3/2007 | Kikkoji et al. |
| 2007/0088801 A1 | 4/2007 | Levkovitz et al. |
| 2007/0100805 A1 | 5/2007 | Ramer et al. |
| 2007/0117571 A1 | 5/2007 | Musial |
| 2007/0149208 A1 | 6/2007 | Syrbe et al. |
| 2008/0032703 A1 | 2/2008 | Krumm et al. |
| 2008/0070579 A1 | 3/2008 | Kankar et al. |
| 2008/0109519 A1 | 5/2008 | Aaltonen et al. |
| 2008/0235342 A1* | 9/2008 | Aaltonen et al. ............ 709/206 |
| 2008/0244024 A1* | 10/2008 | Aaltonen et al. ............ 709/206 |

FOREIGN PATENT DOCUMENTS

| | | |
|---|---|---|
| EP | 1 109 371 A2 | 6/2001 |
| EP | 1 220 132 A2 | 7/2002 |
| EP | 1 365 604 A2 | 11/2003 |
| EP | 1 455 511 A1 | 9/2004 |
| EP | 1 587 332 A1 | 10/2005 |
| EP | 1 615 455 A1 | 1/2006 |
| EP | 1 633 100 A1 | 3/2006 |
| FR | 2 867 931 A1 | 9/2005 |
| GB | 2 406 996 A | 4/2005 |
| JP | 2002140272 | 5/2002 |
| WO | WO 96/24213 | 8/1996 |
| WO | WO 00/44151 A2 | 7/2000 |
| WO | WO 01/22748 A1 | 3/2001 |
| WO | WO 01/31497 A1 | 5/2001 |
| WO | WO 01/52161 A2 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/54803 A1 | 7/2002 |
| WO | WO 02/69585 A2 | 9/2002 |
| WO | WO 02/75574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100521 A1 | 11/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/027407 A1 | 3/2006 |
| WO | WO 2006/093284 A1 | 9/2006 |
| WO | WO 2006/119481 A2 | 11/2006 |
| WO | WO 2008/013437 A1 | 1/2008 |

OTHER PUBLICATIONS

U.K. Further Search Report under Section 17 dated Jul. 25, 2007 issued in connection with corresponding U.K. Application No. GB0621874.7.

U.K. Search Report under Section 17 dated Jan. 2, 2008 issued in connection with corresponding U.K. Application No. GB0716954.3.

Office Action issued from the U.S. Patent and Trademark Office dated Aug. 6, 2009 issued in related U.S. Appl. No. 12/077,089 (15 pages).

Office Action issued from the U.S. Patent and Trademark Office dated Aug. 4, 2009 issued in related U.S. Appl. No. 12/077,045 (14 pages).

PCT International Preliminary Report Report on Patentability issued in related PCT Application No. PCT/EP2007/061792 by the International Bureau of WIPO dated May 5, 2009 (1 page).

PCT Written Opinion issued in related PCT Application No. PCT/EP2007/061792 by the International Searching Authority mailed May 5, 2009 (7 pages).

PCT International Search Report issued in related PCT Application No. PCT/EP2007/061792 by the International Searching Authority mailed Mar. 7, 2008 (3 pages).

Office Action dated Feb. 5, 2009 issued in related U.S. Appl. No. 12/077,089.

Communication (Communication pursuant to Article 94(3) EPC) issued by the European Patent Office in connection with related European Patent Application No. 07 822 138.9 on Mar. 8, 2010 (3 pages).

Office Action dated Mar. 31, 2010 issued by the U.S. Patent Office in connection with related U.S. Appl. No. 12/077,089 (7 pages).

* cited by examiner

INTERACTIVE COMMUNICATIONS SYSTEM

FIELD OF THE INVENTION

The present invention relates to a method of, and system for, controlling access to a plurality of communications sessions involving a plurality of users, and is particularly, but not exclusively, suitable for allocating a group of users to a communications session based on a match between characteristics of a given communications session and characteristics associated with the group.

BACKGROUND INFORMATION

As is well known, communications networks provide a means for users to communicate with one or more other users. Users of a communication system are typically provided with numerous services, such as calls, data communication such as messaging and/or multimedia services, or simply provide users with a gateway to another network, such as the Internet. In relation to any one service, various communication systems, such as public switched telephone networks (PSTN), wireless communication systems, e.g. global system for mobile communications (GSM), general packet radio service (GPRS), universal mobile telecommunications system (UMTS), wireless local area network (WLAN) and so on, and/or other communication networks, such as an Internet Protocol (IP) network, may simultaneously be concerned in providing a connection. An end-user may access a communication network by means of any appropriate communication device, such as user equipment (UE), a mobile station (MS), a cellular phone, a personal digital assistant (PDA), a personal computer (PC), or any other equipment operable according to a suitable network protocol, such as a Session Initiation Protocol (SIP) or a wireless applications protocol (WAP) or a hypertext transfer protocol (HTTP). The user equipment may support, in addition to call and network access functions, other services, such as short message service (SMS), multimedia message service (MMS), electronic mail (email), Web service interface (WSI) messaging and voice mail and one-way messages such as WAP PUSH messages.

Communications services involving more than two users are generally referred to as group communications services, and include the "push-to-talk over cellular" (PoC) service also known as the PTT (push-to-talk service), the instant messaging (IM) service, IRC ("Internet Relay Chat"), and the ICQ ("I Seek You") service. In the case of the IM service, users are allowed to send messages to one or more in a list of predetermined users (a so-called "private list") in a conversational mode, and because they are transmitted "instantly", the transfer of messages back and forth is fast enough for participants to maintain an interactive conversation. The IRC service is a system for chatting that involves a set of rules and conventions and is implemented via client/server software. An IRC client can be downloaded to a user's computer, and the client is then used to connect to an IRC server in an IRC network to start or join an IRC chat group. The fourth group messaging application, ICQ ("I Seek You"), is a client application that provides information as to which "friends" and "contacts" are also online on the Internet, pages them, and operates so as to coordinate a "chat" session with them. The IM system is similarly arranged to generate alerts whenever a member of a given private list is online.

When designing a service, the objectives of the service provider—in terms of their effect on end users—have a significant bearing on the technology that is selected to support the service. For example, services that are designed to deliver information to a selected group of users (with a view to triggering a particular action to be taken on the part of the group members) make use of technology that is designed to match characteristics of the users with those of the information so as to improve the match between what the user receives and what the user wants to receive. Typically such information is delivered from a single source to many recipients, and any subsequent interactions proceed between the recipient and communications devices related to the information source.

As will be appreciated from the foregoing, in addition to transmitting information from one->one and one->many recipients, information can be distributed between members of a group so as to encourage discussion between—and thus impact on—group members, thereby increasing the effectiveness of the information. As described above and in international patent application having publication number WO2006/027407, known group communications methods involve discussions between predetermined or specified members of a group. Thus whilst known group communications services provide a means of increasing the impact of information on users, the extent of this impact is nevertheless limited to that achievable within a closed group of recipients.

SUMMARY OF THE INVENTION

In accordance with one aspect of the present invention, there is provided a method of controlling access to a communications session. Embodiments of the invention thus provide a means of selecting a communications session, or discussion forum, to host a group discussion between members of a group of users, and thus advantageously provide a means of controlling the context for discussion among the group members.

The members of the group are preferably notified of the selected communications session via a WAP message, which contains a link to the communications session, while selection of the communications session can be triggered by receipt of a short message—such as an SMS message—from a member of the group. The SMS message conveniently identifies the group and can contain a line of text or image that the member wants to pass on for discussion. Since the majority of terminals are capable of sending and receiving SMS and WAP messages, the terminals of participating group members do not need to have any bespoke software applications installed on their handsets in order to make use of the new service.

According to another aspect of the present invention there is provided a method which provides a means for groups of users to take part in communications sessions involving participants of a publicly accessible and interactive communications session, and thus provides a mechanism for information to be discussed and disseminated—in a particular period of time—by a wider audience than is possible with present methods.

Further features and advantages of the invention will become apparent from the following description of preferred embodiments of the invention, given by way of example only, which is made with reference to the accompanying drawings.

DETAILED DESCRIPTION

As described briefly above, embodiments of the invention are concerned with coordinating access to a communications session, specifically coordinating access by a predetermined group of terminals to one of a plurality of available communications sessions. Identification of the group members and the methods of providing members with access data for enabling access to the communications session will be described in detail later in the description, but first a description of the infrastructure needed to coordinate access to the communications session will be described.

Figure 1:
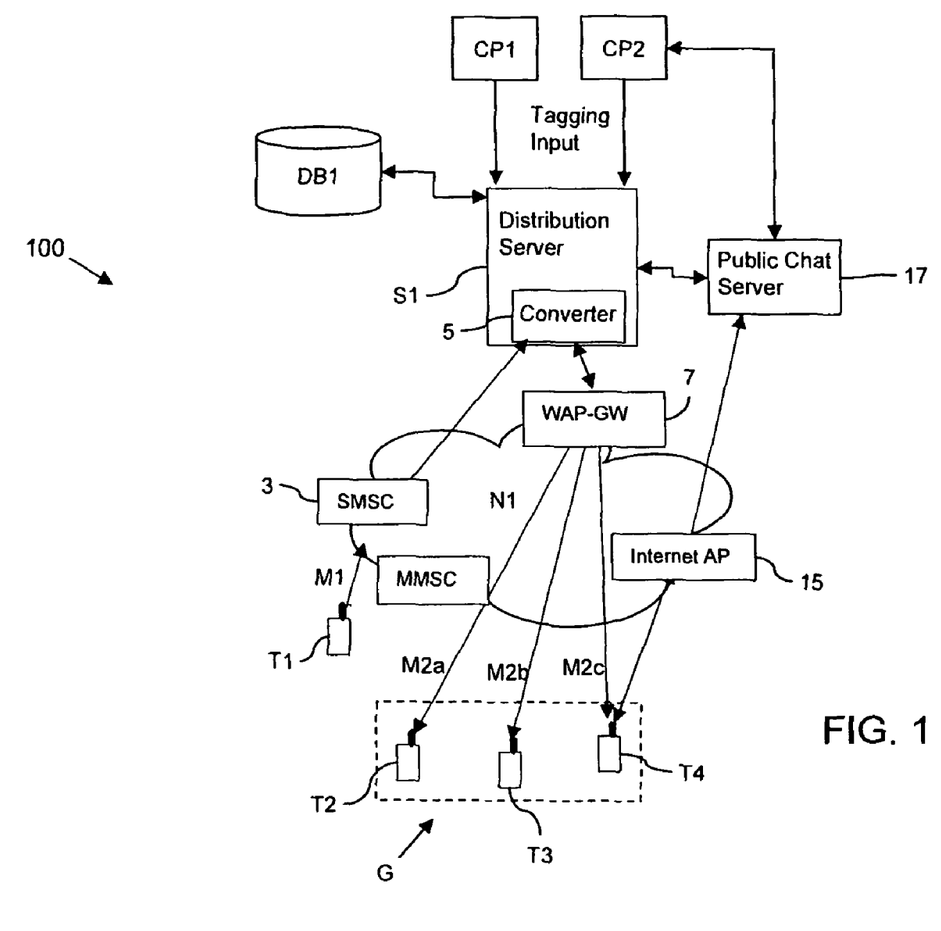
FIG. 1 is a schematic diagram showing a mobile network and network components arranged in accordance with an embodiment of the invention.

FIG. 1 shows an example of a data messaging system 100 within which embodiments of a first aspect of the invention operate; the arrows indicate data flows within the data messaging system 100 and the objects indicate components of the data messaging system 100. This Figure shows an arrangement of network components suitable for the delivery of WAP messages, Short Message (SMS messages), Multimedia messages (MMS messages), bespoke messages in the form of GPRS data and/or streamed data; as will be appreciated, the specific arrangement of the data messaging system 100 is dependent on the type of message being used to facilitate the coordination.

In the arrangement shown in FIG. 1, a terminal T1 communicates with various network devices within the data messaging system 100. The terminal T1 may be a wireless terminal such as a mobile phone, a PDA or a Laptop computer, or it may be a fixed terminal, e.g. in the form of a Personal Computer. In the arrangement shown in FIG. 1 the data messaging system 100 comprises: a WAP gateway 7, which is typically a network operator's WAP gateway; a distribution server S1; and a database DB1, arranged to store at least some of:

data in respect of users of the data messaging system 100, including data identifying interests and characteristics of individual users and groups of users;
  data in respect of terminals such as terminals T1, T2, T3 and T4;
  data in respect of tagging content, including image (static, dynamic and/or interactive images), alphanumeric characters and content control information, the data having been provided by various content providers CP1, CP2; and
  communications sessions data in respect of communications sessions, including: data identifying sponsors; demographic requirements (in terms of types of users who are preferred participants of a given communications session); priority information; and status information (e.g. active, inactive etc.). The communications sessions, and thus sponsor, demographic and priority information, can be related to the content providers CP1, CP2.

In one arrangement the distribution server S1 and the database DB1 are located within a proprietary network, which means that they operate independently of any specific network operator and can be shared across a plurality of network operators. Using techniques known in the art, the database DB1 can store the preference and demographic data that are used to control selection of a communications session, or discussion forum, as described below.

Figure 2:
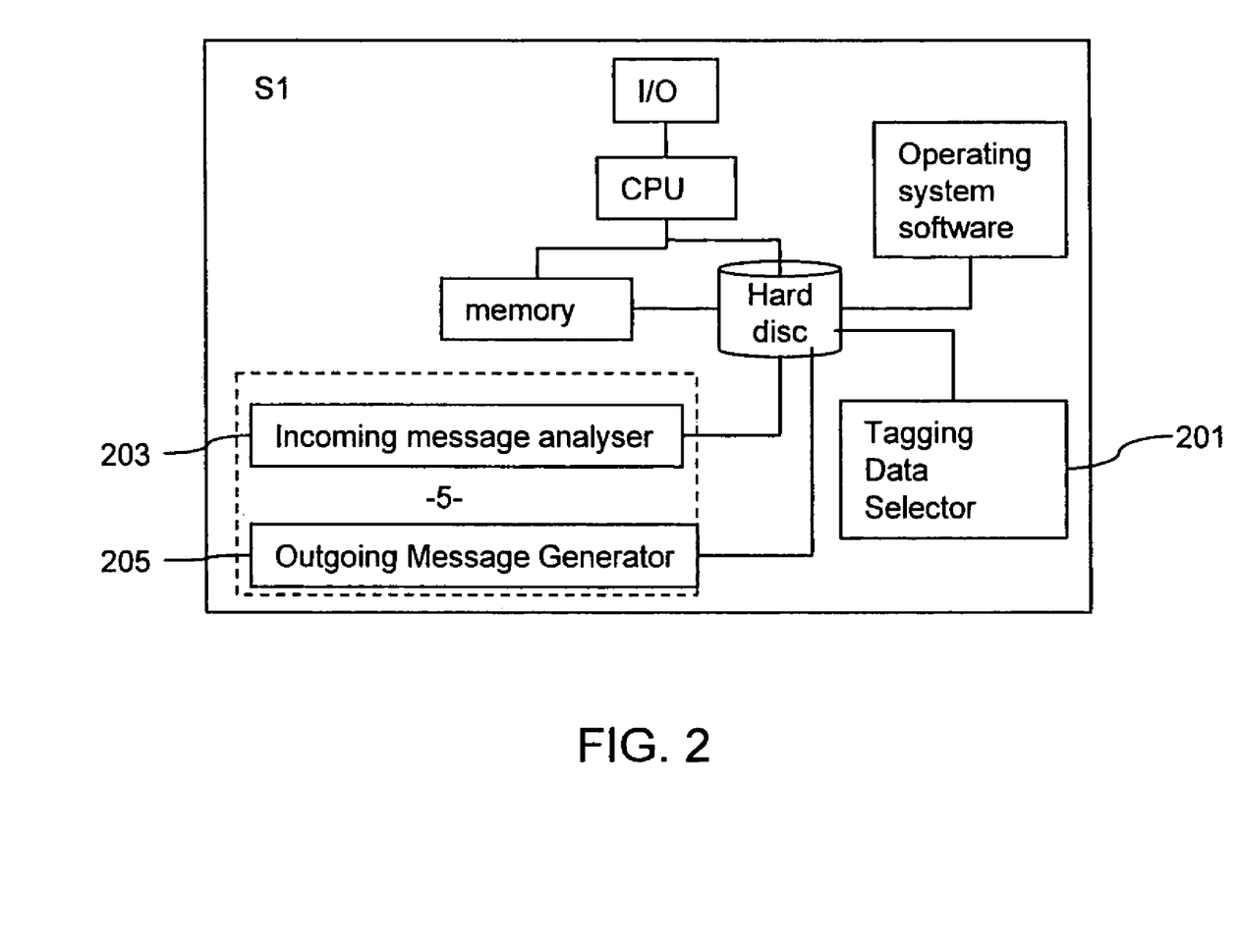
FIG. 2 is a schematic block diagram showing in detail the functionality associated with a distribution server shown in FIG. 1.
Figure 3:
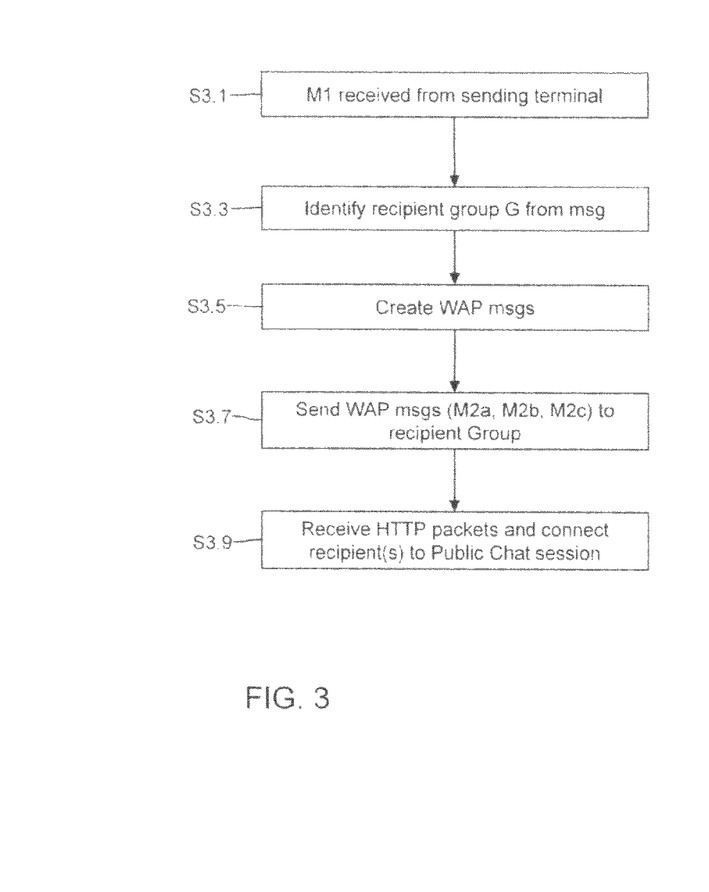
FIG. 3 is a schematic flow diagram showing a process for coordinating group participation in a communications session according to an embodiment of the invention.

The functionality of the distribution server S1 will now be described with reference to FIGS. 2 and 3. In addition to standard CPU, memory, data bus, Input/Output ports, data storage, and operating system programs, the distribution server S1 comprises certain bespoke functional components, namely:

tagging data selector software component 201 for selecting tagging data from the database DB1;
  message analyser component 203 for identifying group members that are to be joined with the selected communications session; and
  outgoing message generator component 205 for selecting a communications session to which the group members are to be joined and for creating messages that include access data enabling recipients of a given message to join the selected communications session.

In a first embodiment the incoming (or initiating or originating) message M1 is an SMS message originating from the terminal T1; the originating message M1 contains a message body and carries details of a group of recipients such that the incoming message analyser 203 can identify the group identifier from the message. In one arrangement, during message creation the sending terminal T1 prompts the sending subscriber to select a group from a preconfigured list of groups stored on the terminal T1, causing the terminal T1 to create an SMS message identifying the selected group and having a format compatible with the format requirements of the message analyser component 203. This arrangement presupposes that the message analyser component 203 has access to the predetermined groups and members thereof.

In an alternative arrangement, the user of the terminal T1 enters an identifier for a group manually within the content of the SMS message M1; for example groups could be identified by numbers or by special characters, such as: "%This is a group message", "#This is a group message", "&This is a group message", where first one would be forwarded to group identified with %, second with # and third with &. As for the first arrangement, the group members corresponding to a given character would be accessible to the message analyser component 203 (such special character definitions groups could be specified via web interface).

In a yet further arrangement, and instead of selecting a group identifier that relates to a predetermined set of group members, the sending terminal T1 could prompt the user to simply select "Group" from a list of possible message types, without selecting a specific group identity. In this arrangement the terminal T1 would create an SMS message identifying that message M1 is intended to spawn creation of a group message, but identification of the group members would be a process performed by the message analyser component 203, and thus in real time rather than based on any predetermined group lists. In a yet further arrangement the terminal could be configured to analyse the content of individual messages, and for those whose content is determined to be identical to that of other messages, the terminal could send out a single message with an identifier indicating the message to be of a group type.

The message M1 could include additional information entered at terminal T1, such as keywords identifying subject matter of particular interest at the time of sending the message, and these can be used by the tagging data selector 201 when selecting the communications session to which the group members are to be joined.

In any of these arrangements, the destination address of the SMS message M1 would be the network identity of the server S1.

For an arrangement in which individual messages are sent out to individual recipients (without analysis by the terminal T1 in the manner specified above), the message analyser component 203 would either be directly associated with SMSC 3, or the SMSC 3 would be provisioned with specific forwarding instructions in respect of individual recipients so as to ensure that the individual SMS messages M1 are forwarded to the server S1. Once received, the message analyser component 203 would analyse the content of individual messages so as to determine those having identical content, and deriving a group on the basis of the content of the messages M1.

It will be understood from the foregoing that the function of the message analyser component 203 is at least to derive the identities of group members to whom communications sessions invitations are to be sent. These process steps are indicated in FIG. 3 by S3.1 and S3.3.

Turning now to the creation of messages inviting group members to communications sessions, the outgoing message generator 205 is arranged to create individual invitation messages M2a, M2b, M2c, one for each member of the group identified by the message analyser component 203. In one embodiment these messages M2a, M2b, M2c are embodied as WAP messages; WAP is a convenient choice of format for the outgoing messages because it allows links such as URLs and the like to be included within a message, these being displayed as a selectable object on a recipient's terminal which, when selected, cause the terminal to retrieve data from the network address associated with the object.

As described above, embodiments of the invention are concerned with coordinating the joining of members of a group to a communications session, and the links that are inserted into a given WAP message M2a, M2b, M2c created by the outgoing message generator 205 include links to discussion forums and the like. Preferably at least some of the discussion forums are publicly accessible so that, in at least some embodiments, whilst a group identifier is used to select individuals to involve in a communications session, the communications session to which they are invited to attend is not limited to group members only. This differs significantly from conventional methods such as those described in international patent application having publication number WO06/027407, where the group identifier serves both to identify individuals to involve in a given discussion, and to define the participants in the discussion.

Selection of a communications session can be dependent on attributes such as keywords specified in the initiating message M1 (if available), and/or time of receipt of the initiating message M1, and/or profile data corresponding to the group and/or one or more of the identified group members. Accordingly, upon receipt of the group member identities, the outgoing message generator 205 is arranged to access the database DB1 and retrieve interests and preference data corresponding to at least some of the group and/or individual group members, and to compare these data with attributes of currently active and accessible communications sessions. The attributes of a given communications session include a set of demographic requirements, these having been specified by the host of a given communications session and being matched against the preference and interests data corresponding to individuals of the group G (or the group itself), thereby effectively controlling which types of groups are allowed to access a given communications session. In addition the attributes can include priority information, this having been specified or negotiated by a content provider CP1, CP2 (for example) and being used by the outgoing message generator 205 when selecting a specific communications session from those available.

Figure 4:
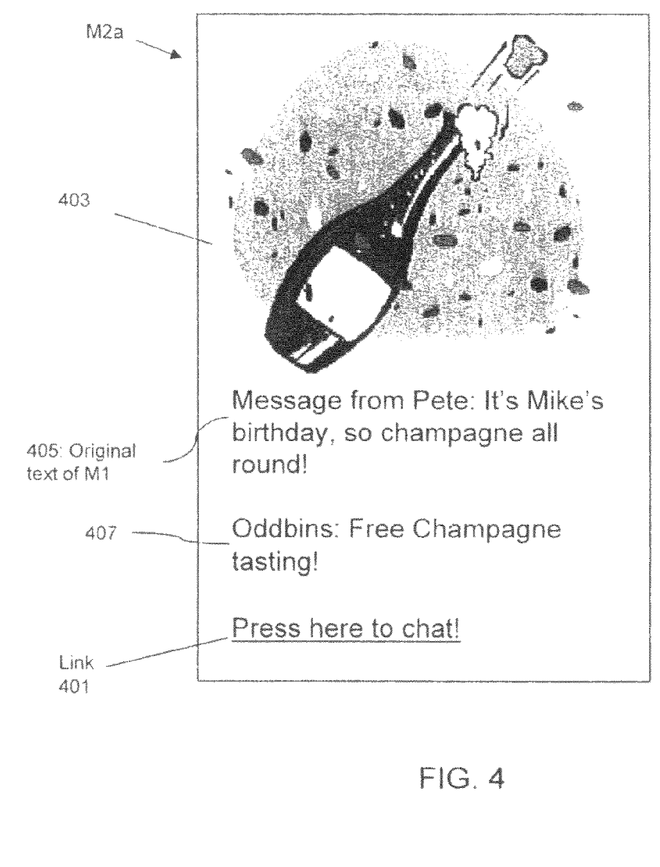
FIG. 4 is a schematic diagram showing an example of an outgoing message created by the distribution server shown in FIG. 2.

An example outgoing, or invitation, message M2a including a link 401 to a communications session is shown in FIG. 4: the link 401 is embodied as a selectable object and is identifiable from the text "Press here to chat!"

The outgoing message generator 205 can also cooperate with the tagging data selector software component 201 so as to select and insert information tags (such as those identified by reference numerals 403, 407) into the invitation messages M2a, M2b, M2c. The tagging software component 201 is arranged to select image and/or text and/or audio and/or video tagging data on the basis of demographic data corresponding to one or more of the identified group members and from the repository of tagging data stored in the database DB1 and/or the text contained within the initiating message M1. For the example shown in FIG. 4, it can be seen that the text 405 of the initiating message M1 has been used to select both the image tag 403 and the text tag 407: the invitation messages M2a, M2b, M2c include the text 405 included in the initiating message M1, together with information as to the origins of the invitation messages M2a, M2b, M2c ("Message from Pete . . .") thereby providing suitable context for the tag data 403, 407 when the invitation message M2a is reviewed by a recipient. The foregoing message creation process is indicated generally in FIG. 3 at step S3.5.

In view of the fact that the tags 403, 407 are included with the link to the selected communications session, it will be appreciated that these tags 403, 407 can be used to steer group discussions within the communications session towards the subject matter of the tagging data, for example with incentives in the event that any participant of the group communications session purchase certain goods—from certain providers—during the communications session (or within a specified period thereafter).

Furthermore, since the link 401 is the trigger for the IM chat session, the tags 403, 407 accompanying the link 401 essentially serve to announce or promote the selected communications session. Thus in at least some embodiments, the data to be selected for inclusion in a given message are advertisement data, and in the case of the advertisement data relating directly or indirectly to the communications session associated with the link 401, the tags 403, 407 could identify a sponsor thereof.

Once the WAP messages M2a, M2b, M2c have been created, they are sent to the recipients identified at step S3.3 via the WAP gateway 7 (step S3.7), as is known in the art. It is to be noted that whilst not shown in FIG. 1, a WAP message is also preferably sent to the terminal T1 from which the initiating message M1 was received (in this example, Pete's terminal).

The transmission of the WAP messages M2a . . . M2c marks the end of the involvement of the distribution server S1, since selection of the link 401 is transmitted to network components associated with the link, and this process is independent of the distribution server S1. Thus, if activation of the link 401 results in a HTTP request message to be transmitted to a web server running an IM chat session for example, subsequent messages would be transmitted in accordance with IM and its associated protocols (step S3.9).

Whilst in the embodiments described above the message M1 is an SMS message, it is to be understood that message M1 could alternatively be a USSD, MMS, email or any other type of message capable of identifying a group of recipient terminals. Similarly, whilst in the above embodiments the outgoing messages are embodied as PUSH WAP messages, they could alternatively be embodied as MMS messages, SMS messages with link in text form, bookmarks to mobile terminal, e-mail, voice call, broadcast message using cellular networks (such as Multimedia Broadcast/Multicast Service (MBMS) over Wideband Code Division Multiple Access (WCDMA)) or broadcast messages using broadcast networks (such as Digital Video Broadcast—Handheld (digital TV) (DVB-H), Integrated Services Digital Broadcasting—Terrestrial (ISDB-T), Digital Audio Broadcasting (DAB), Forward Link Only (Qualcomm) (Flo), Digital Multimedia Broadcasting (DMB), Radio Data Service (RDS) channel of radio network to mention few), any multicast or broadcast IP session indicator protocol.

In the above embodiments, access to a communications session is described in relation to a single group. However, selection of a communications session could be made on the basis of the identity—and thus demographic data—corresponding to groups that have already been notified of a communications session. Thus in addition to reviewing priority and demographic requirements of a given communications session, the outgoing message generator 205 could be arranged to review the identity of groups to whom invitation messages have previously been sent, and compare the demographic data between the respective groups in order to select a communications session for the subsequently requesting group members.

The above embodiments are to be understood as illustrative and non-limiting examples of the invention, which is concerned with facilitating access to discussion forums by predetermined groups of users. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method, being executed on hardware, of coordinating a communications session involving a plurality of users, the method comprising:
    receiving a SMS message comprising within the content of the message data indicative of a group of users as keywords entered by a sender of the SMS message identifying subject matter of the SMS message; and
    transmitting, responsive to identifying members of the group, a message to at least some members of the group, the message having a message body comprising data providing access to a communications session and a destination address determined from the keywords,
    wherein the communications session accessible via said transmitted message involves participants other than the group members, and
    wherein the data providing access to the communications session comprises a user selectable link comprising a URL, which when selected enables a member's terminal to retrieve data from the destination address.

2. The method according to claim 1, wherein the selectable link is a publicly accessible communications session.

3. The method according to claim 1, wherein said data indicative of a group of users is received via a data message.

4. The method according to claim 3, wherein the data message includes a group identifier, and the method further comprises accessing a storage system so as to identify group members corresponding thereto.

5. The method according to claim 4, wherein the data message includes one or more keywords, and the method further comprises accessing a storage system so as to identify users having preference data corresponding to said keywords, whereby to identify members of the group.

6. The method according to claim 3, wherein the data message includes one or more keywords, and the method further comprises accessing a storage system so as to identify users having preference data corresponding to said keywords, whereby to identify members of the group.

7. The method according to claim 6, wherein received data indicative of a group of users is received from a terminal associated with a member of the group, and the method further comprises identifying the group members on the basis of an identifier associated with said terminal.

8. The method according to claim 7, wherein said received data indicative of a group of users is received from an information source, and the method further comprises identifying the group members on the basis of an identifier associated with said information source.

9. The method according to claim 8, further comprising selecting said communications session from a list of predetermined communications sessions.

10. The method according to claim 9, further comprising selecting said communications session on the basis of priority information associated with said predetermined communications sessions.

11. The method according to claim 10, further comprising identifying preference data associated with said identified members of the group and matching said identified preference data with preference data associated with said predetermined communications sessions, whereby to select the communications session.

12. The method according to claim 11, further comprising identifying preference data associated with said identified members of the group and matching said identified preference data with preference data associated with said members of a group previously notified of the communications session, whereby to select the communications session.

13. The method according to claim 11, further comprising creating a plurality of messages for transmission to said at least some members of the group, in which each said created message contains the selectable link to the communications session, wherein the communications session is publically accessible.

14. The method according to claim 13, further comprising identifying content accompanying the data indicative of said group of users, and appending said identified content to each said created message.

15. The method according to claim 14, further comprising accessing an information source so as to retrieve information relating to said at least some members of the group, and appending the retrieved information to each said created message.

16. The method according to claim 1, wherein the communications session is in progress at the time of transmission of the messages to said at least some members of the group.

17. The method according to claim 1, wherein the communications session is triggered in response to receipt of a HTTP request from one of said members of the group.

18. The method according to claim 1, wherein the data indicative of a group of users is received via the short messaging service (SMS).

19. The method according to claim 1, wherein the data indicative of a group of users is received via the Unstructured Supplementary Services Data (USSD) messaging service.

20. The method according to claim 1, wherein the messages are transmitted to the at least some members of the group via the Wireless Application Protocol (WAP) Push messaging service.

21. Apparatus which coordinates a communications session involving a plurality of users, the apparatus comprising:
a receiver which receives a SMS message comprising within the content of the message data indicative of a group of users as keywords entered by a sender of the SMS message identifying subject matter of the SMS message; and
a transmitter, responsive to identifying members of the group, which transmits a message to at least some members of the group, the message having a message body comprising data providing access to a communications session and a destination address determined from the keywords,
wherein the communications session accessible via said transmitted message involves participants other than the group members, and
wherein the data providing access to the communications session comprises a user selectable link comprising a URL, which when selected enables a member's terminal to retrieve data from the destination address.

22. The apparatus according to claim 21, wherein the selectable link is a publicly accessible communications session.

23. The apparatus according to claim 21, wherein said data indicative of a group of users is received via a data message.

24. The apparatus according to claim 23, wherein the data message contains a group identifier, and the apparatus further comprises a storage system and a message generator which accesses the storage system to identify group members corresponding thereto.

25. The apparatus according to claim 24, wherein the data message contains one or more keywords, and the message generator accesses the storage system to identify users having preference data corresponding to said keywords, whereby to identify members of the group.

26. The apparatus according to claim 23, wherein the data message contains one or more keywords, and the apparatus further comprises a storage system and a message generator which accesses the storage system to identify users having preference data corresponding to said keywords, whereby to identify members of the group.

27. The apparatus according to claim 26, wherein received data indicative of a group of users is received from a terminal associated with a member of the group, and the message generator identifies the group members on the basis of an identifier associated with said terminal.

28. The apparatus method according to claim 27, wherein said received data indicative of a group of users is received from an information source, and the message generator identifies the group members on the basis of an identifier associated with said information source.

29. The apparatus according to claim 28, wherein the message generator selects said communications session from a list of predetermined communications sessions.

30. The apparatus according to claim 29, wherein the message generator selects said communications session on the basis of priority information associated with said predetermined communications sessions.

31. The apparatus according to claim 30, wherein the message generator identifies preference data associated with said identified members of the group and matches said identified preference data with preference data associated with said predetermined communications sessions, whereby to select the communications session.

32. The apparatus according to claim 30, wherein the message generator identifies preference data associated with said identified members of the group and matches said identified preference data with preference data associated with said members of a group previously notified of the communications session, whereby to select the communications session.

33. The apparatus according to claim 32, wherein the message generator creates a plurality of messages for transmission to said at least some members of the group, in which each said created message contains the selectable link to the communications session, wherein the communications session is publically accessible.

34. The apparatus according to claim 33, wherein the message generator identifies content accompanying the data indicative of said group of users, and appends said identified content to each said created message.

35. The apparatus according to claim 34, wherein the message generator accesses an information source so as to retrieve information relating to said at least some members of the group, and appends the retrieved information to each said created message.

36. The apparatus according to claim 21, wherein the communications session is in progress at the time of transmission of the messages to said at least some members of the group.

37. The apparatus according to claim 21, wherein the communications session is triggered in response to receipt of a HTTP request from one of said members of the group.

38. The apparatus according to claim 21, wherein the data indicative of a group of users is received via the short messaging service (SMS).

39. The apparatus according to claim 21, wherein the data indicative of a group of users is received via the Unstructured Supplementary Services Data (USSD) messaging service.

40. The apparatus according to claim 21, wherein the messages are transmitted to the at least some members of the group via the Wireless Application Protocol (WAP) Push messaging service.

41. A computer program resident on computer-readable media, being executed on hardware, and arranged to coordinate a communications session involving a plurality of users, the computer program being arranged to:
receive a SMS message comprising within the content of the message data indicative of a group of users as keywords entered by a sender of the SMS message identifying subject matter of the SMS message; and
transmit, responsive to identifying members of the group, a message to at least some members of the group, the message having a message body comprising data providing access to a communications session and a destination address determined from the keywords,
wherein the communications session accessible via said transmitted message involves participants other than the group members, and
wherein the data providing access to the communications session comprises a user selectable link comprising a URL, which when selected enables a member's terminal to retrieve data from the destination address.

42. The computer program according to claim 41, wherein the selectable link is a publicly accessible communications session.

43. The computer program according to claim 41, wherein said data indicative of a group of users is received via a data message.

44. The computer program according to claim 43, wherein the data message contains a group identifier, and the computer program is further arranged to access a storage system so as to identify group members corresponding thereto.

45. The computer program according to claim 44, wherein the data message contains one or more keywords, and the computer program is further arranged to access a storage system so as to identify users having preference data corresponding to said keywords, whereby to identify members of the group.

46. The computer program according to claim 43, wherein the data message contains one or more keywords, and the computer program is further arranged to access a storage system so as to identify users having preference data corresponding to said keywords, whereby to identify members of the group.

47. The computer program according to claim 46, wherein received data indicative of a group of users is received from a terminal associated with a member of the group, and the computer program is further arranged to identify the group members on the basis of an identifier associated with said terminal.

48. The computer program according to claim 47, wherein said received data indicative of a group of users is received from an information source, and the computer program is further arranged to identify the group members on the basis of an identifier associated with said information source.

49. The computer program according to claim 48, wherein the computer program is further arranged to select said communications session from a list of predetermined communications sessions.

50. The computer program according to claim 49, wherein the computer program is further arranged to select said communications session on the basis of priority information associated with said predetermined communications sessions.

51. The computer program according to claim 50, wherein the computer program is further arranged to identify preference data associated with said identified members of the group and matching said identified preference data with preference data associated with said predetermined communications sessions, whereby to select the communications session.

52. The computer program according to claim 51, wherein the computer program is further arranged to identify preference data associated with said identified members of the group and matching said identified preference data with preference data associated with said members of a group previously notified of the communications session, whereby to select the communications session.

53. The computer program according to claim 51, wherein the computer program is further arranged to create a plurality of messages for transmission to said at least some members of the group, in which each said created message contains the selectable link to the selected communications session, wherein the communications session is publically accessible.

54. The computer program according to claim 53, wherein the computer program is further arranged to identify content accompanying the data indicative of said group of users, and appending said identified content to each said created message.

55. The computer program according to claim 54, wherein the computer program is further arranged to access an information source so as to retrieve information relating to said at least some members of the group, and appending the retrieved information to each said created message.

56. The computer program according to claim 41, wherein the communications session is in progress at the time of transmission of the messages to said at least some members of the group.

57. The computer program according to claim 41, wherein the communications session is triggered in response to receipt of a HTTP request from one of said members of the group.

58. The computer program according to claim 41, wherein the data indicative of a group of users is received via the short messaging service (SMS).

59. The computer program according to claim 41, wherein the data indicative of a group of users is received via the Unstructured Supplementary Services Data (USSD) messaging service.

60. The computer program according to claim 41, wherein the messages are transmitted to the at least some members of the group via the Wireless Application Protocol (WAP) Push messaging service.

61. A method, being executed on hardware, of announcing a group communications session for access by a plurality of users, wherein data identifying said communications session have been stored in association with data indicative of one or more characteristics thereof, the method comprising:
  receiving a SMS message comprising within the content of the message data indicative of a group of users as keywords entered by a sender of the SMS message identifying subject matter of the SMS message;
  selecting a communications session on the basis of data identifying the group and at least some of said stored data being indicative of characteristics of a given communications session; and
  transmitting a message to at least some members of the group, the message having a message body comprising data providing access to the selected communications session and a destination address determined from the keywords,
  wherein the message body comprises an information portion providing information in relation to the communications session, the information portion being selected at least on the basis of stored data associated with the selected communications session, and
  wherein the data providing access to the selected communications session comprises a user selectable link comprising a URL, which when selected enables a member's terminal to retrieve data from the destination address determined when selected.

62. The method according to claim 61, wherein the selectable link is a publicly accessible communications session.

63. The method according to claim 61, wherein said data indicative of a group of users is received via a data message.

64. The method according to claim 63, wherein the data message includes a group identifier, and the method further comprises accessing a storage system so as to identify group members corresponding thereto.

65. The method according to claim 64, wherein the data message includes one or more keywords, and the method further comprises accessing a storage system so as to identify users having preference data corresponding to said keywords, whereby to identify members of the group.

66. The method according to claim 63, wherein the data message includes one or more keywords, and the method further comprises accessing a storage system so as to identify users having preference data corresponding to said keywords, whereby to identify members of the group.

67. The method according to claim 66, wherein data received indicative of a group of users is received from a terminal associated with a member of the group, and the method further comprises identifying the group members on the basis of an identifier associated with said terminal.

68. The method according to claim 67, wherein said received data indicative of a group of users is received from an information source, and the method further comprises identifying the group members on the basis of an identifier associated with said information source.

69. The method according to claim 68, further comprising selecting said communications session from a list of predetermined communications sessions.

70. The method according to claim 69, further comprising selecting said communications session on the basis of priority information associated with said predetermined communications sessions.

71. The method according to claim 70, further comprising identifying preference data associated with said identified members of the group and matching said identified preference data with preference data associated with said predetermined communications sessions, whereby to select the communications session.

72. The method according to claim 71, further comprising identifying preference data associated with said identified members of the group and matching said identified preference data with preference data associated with said members of a group previously notified of the communications session, whereby to select the communications session.

73. The method according to claim 71, including creating a plurality of messages for transmission to said at least some members of the group, in which each said created message contains the selectable link to the selected communications session, wherein the communications session is publically accessible.

74. The method according to claim 73, further comprising identifying content accompanying the data indicative of said group of users, and appending said identified content to each said created message.

75. The method according to claim 74, further comprising accessing an information source so as to retrieve information relating to said at least some members of the group, and appending the retrieved information to each said created message.

76. The method according to claim 61, wherein the communications session is in progress at the time of transmission of the messages to said at least some members of the group.

77. The method according to claim 61, wherein the communications session is triggered in response to receipt of a HTTP request from one of said members of the group.

78. The method according to claim 61, wherein the data indicative of a group of users is received via the short messaging service (SMS).

79. The method according to claim 61, wherein the data indicative of a group of users is received via the Unstructured Supplementary Services Data (USSD) messaging service.

80. The method according to claim 61, wherein the messages are transmitted to the at least some members of the group via the Wireless Application Protocol (WAP) Push messaging service.

81. Apparatus which announces a group communications session for access by a plurality of users, wherein data identifying said communications session have been stored in association with data indicative of one or more characteristics thereof, the apparatus comprising:
  a receiver which receives a SMS message comprising within the content of the SMS message data indicative of a group of users as keywords entered by a sender of the message identifying subject matter of the SMS message;
  a selector which selects a communications session on the basis of data identifying the group and at least some of said stored data indicative of characteristics of a given communications session; and
  a transmitter which transmits a message to at least some members of the group, the message having a message body comprising data providing access to the selected communications session and a destination address determined from the keywords,
  wherein the message body comprises an information portion providing information in relation to the communications session, the information portion being selected at least on the basis of stored data associated with the selected communications session, and
  wherein the data providing access to the communications session comprises a user selectable link comprising a URL, which when selected enables a member's terminal to retrieve data from the destination address.

82. The apparatus according to claim 81, wherein the selectable link is a publicly accessible communications session.

83. The apparatus according to claim 81, wherein said data indicative of a group of users is received via a data message.

84. The apparatus according to claim 83, wherein the data message contains a group identifier, and the apparatus further comprises a storage system and a message generator which accesses the storage system to identify group members corresponding thereto.

85. The apparatus according to claim 84, wherein the data message contains one or more keywords, and the message generator accesses the storage system to identify users having preference data corresponding to said keywords, whereby to identify members of the group.

86. The apparatus according to claim 83, wherein the data message contains one or more keywords, and the message generator accesses the storage system to identify users having preference data corresponding to said keywords, whereby to identify members of the group.

87. The apparatus according to claim 86, wherein received data indicative of a group of users is received from a terminal associated with a member of the group, and the message generator identifies the group members on the basis of an identifier associated with said terminal.

88. The apparatus according to claim 87, wherein said received data indicative of a group of users is received from an information source, and the message generator identifies the group members on the basis of an identifier associated with said information source.

89. The apparatus according to claim 88, wherein the message generator selects said communications session from a list of predetermined communications sessions.

90. The apparatus according to claim 89, wherein the message generator selects said communications session on the basis of priority information associated with said predetermined communications sessions.

91. The apparatus according to claim 90, wherein the message generator identifies preference data associated with said identified members of the group and matches said identified preference data with preference data associated with said predetermined communications sessions, whereby to select the communications session.

92. The apparatus according to claim 91, wherein the message generator identifies preference data associated with said identified members of the group and matches said identified preference data with preference data associated with said members of a group previously notified of the communications session, whereby to select the communications session.

93. The apparatus according to claim 91, wherein the message generator creates a plurality of messages for transmission to said at least some members of the group, in which each said created message contains the selectable link to the selected communications session, wherein the communication session is publically accessible.

94. The apparatus according to claim 93, wherein the message generator identifies content accompanying the data indicative of said group of users, and appends said identified content to each said created message.

95. The apparatus according to claim 94, wherein the message generator accesses an information source so as to retrieve information relating to said at least some members of the group, and appends the retrieved information to each said created message.

96. The apparatus according to claim 81, wherein the communications session is in progress at the time of transmission of the messages to said at least some members of the group.

97. The apparatus according to claim 81, wherein the communications session is triggered in response to receipt of a HTTP request from one of said members of the group.

98. The apparatus according to claim 81, wherein the data indicative of a group of users is received via the short messaging service (SMS).

99. The apparatus according to claim 81, wherein the data indicative of a group of users is received via the Unstructured Supplementary Services Data (USSD) messaging service.

100. The apparatus according to claim 81, wherein the messages are transmitted to the at least some members of the group via the Wireless Application Protocol (WAP) Push messaging service.

101. A computer program resident on computer-readable media, being executed on hardware, and arranged to announce a group communications session for access by a plurality of users, wherein data identifying said communications session have been stored in association with data indicative of one or more characteristics thereof, the computer program being arranged to:
receive a SMS message comprising within the content of the message data indicative of a group of users as keywords entered by a sender of the SMS message identifying subject matter of the SMS message;
select a communications session on the basis of data identifying the group and at least some of said stored data indicative of characteristics of a given communications session; and
transmit a message to at least some members of the group, the message having a message body comprising data providing access to the selected communications session and a destination address determined from the keywords,
wherein the message body comprises an information portion providing information in relation to the communications session, the information portion being selected at least on the basis of stored data associated with the selected communications session, and
wherein the data providing access to the selected communications session comprises a user selectable link comprising a URL, which when selected enables a member's terminal to retrieve data from the destination address.

102. The computer program according to claim 101, wherein the selectable link is a publicly accessible communications session.

103. The computer program according to claim 101, wherein said data indicative of a group of users is received via a data message.

104. The computer program according to claim 103, wherein the data message contains a group identifier, and the computer program is further arranged to access a storage system so as to identify group members corresponding thereto.

105. The computer program according to claim 104, wherein the data message contains one or more keywords, and the computer program is further arranged to access a storage system so as to identify users having preference data corresponding to said keywords, whereby to identify members of the group.

106. The computer program according to claim 103, wherein the data message contains one or more keywords, and the computer program is further arranged to access a storage system so as to identify users having preference data corresponding to said keywords, whereby to identify members of the group.

107. The computer program according to claim 106, wherein received data indicative of a group of users is received from a terminal associated with a member of the group, and the computer program is further arranged to identify the group members on the basis of an identifier associated with said terminal.

108. The computer program according to claim 107, wherein said received data indicative of a group of users is received from an information source, and the computer program is further arranged to identify the group members on the basis of an identifier associated with said information source.

109. The computer program according to claim 108, wherein the computer program is further arranged to select said communications session from a list of predetermined communications sessions.

110. The computer program according to claim 109, wherein the computer program is further arranged to select said communications session on the basis of priority information associated with said predetermined communications sessions.

111. The computer program according to claim 110, wherein the computer program is further arranged to identify preference data associated with said identified members of the group and matching said identified preference data with preference data associated with said predetermined communications sessions, whereby to select the communications session.

112. The computer program according to claim 111, wherein the computer program is further arranged to identify preference data associated with said identified members of the group and matching said identified preference data with preference data associated with said members of a group previously notified of the communications session, whereby to select the communications session.

113. The computer program according to claim 111, wherein the computer program is further arranged to create a plurality of messages for transmission to said at least some members of the group, in which each said created message contains the selectable link to the selected communications session, wherein the communications session is publically accessible.

114. The computer program according to claim 113, wherein the computer program is further arranged to identify content accompanying the data indicative of said group of users, and appending said identified content to each said created message.

115. The computer program according to claim 114, wherein the computer program is further arranged to access an information source so as to retrieve information relating to said at least some members of the group, and appending the retrieved information to each said created message.

116. The computer program according to claim 101, wherein the communications session is in progress at the time of transmission of the messages to said at least some members of the group.

117. The computer program according to claim 101, wherein the communications session is triggered in response to receipt of a HTTP request from one of said members of the group.

118. The computer program according to claim 101, wherein the data indicative of a group of users is received via the short messaging service (SMS).

119. The computer program according to claim 101, wherein the data indicative of a group of users is received via the Unstructured Supplementary Services Data (USSD) messaging service.

120. The computer program according to claim 101, wherein the messages are transmitted to at least some members of the group via the Wireless Application Protocol (WAP) Push messaging service.

* * * * *